(12) United States Patent
Silvera et al.

(10) Patent No.: US 8,769,000 B2
(45) Date of Patent: Jul. 1, 2014

(54) ADAPTIVE NETWORK COMMUNICATION TECHNIQUES

(75) Inventors: Jonathan A. Silvera, Seattle, WA (US); Ivan D. Pashov, Woodinville, WA (US); Paul Trunley, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 240 days.

(21) Appl. No.: 13/018,706

(22) Filed: Feb. 1, 2011

(65) Prior Publication Data

US 2012/0198078 A1     Aug. 2, 2012

(51) Int. Cl.
    *G06F 15/16*     (2006.01)

(52) U.S. Cl.
    USPC ............ 709/203; 709/219; 709/227; 709/232

(58) Field of Classification Search
    USPC .......................... 709/217, 218, 222, 227, 232
    See application file for complete search history.

(56) References Cited

U.S. PATENT DOCUMENTS

| | | | |
|---|---|---|---|
| 6,744,452 B1 | 6/2004 | McBrearty et al. | |
| 7,096,418 B1 | 8/2006 | Singhal et al. | |
| 7,312,390 B2 * | 12/2007 | Yanagawa et al. | 84/615 |
| 7,430,633 B2 | 9/2008 | Church et al. | |
| 7,555,561 B2 | 6/2009 | Michel | |
| 7,647,339 B2 | 1/2010 | Gonzalez | |
| 2005/0060498 A1 * | 3/2005 | Curtis | 711/134 |
| 2005/0240940 A1 * | 10/2005 | Quinet et al. | 719/315 |
| 2007/0005779 A1 * | 1/2007 | Yao et al. | 709/228 |
| 2009/0287750 A1 * | 11/2009 | Banavar et al. | 707/204 |
| 2010/0049872 A1 * | 2/2010 | Roskind | 709/245 |
| 2010/0057936 A1 * | 3/2010 | Roskind | 709/245 |
| 2010/0146415 A1 * | 6/2010 | Lepeska | 715/760 |
| 2011/0153807 A1 * | 6/2011 | Vicisano et al. | 709/224 |

FOREIGN PATENT DOCUMENTS

CN     101051898     10/2007

OTHER PUBLICATIONS

Cluts, Nancy, "Control Your Cache, Speed up Your Site", Retrieved at << http://msdn.microsoft.com/en-us/library/bb250440(v=vs.85).aspx , Mar. 18, 1999, pp. 3.
"Refreshing or Reloading Your Browser Window", Retrieved at << http://www.southboroughwebsitedesign.com/tips/refreshbrowser.htm >>, Retrieved Date : Dec. 17, 2010, pp. 3.
"What is IE Save Buddy?", Retrieved at << http://www.doeasier.org/iesavebuddy/ >>, Retrieved Date : Dec. 17, 2010, pp. 3.
"Foreign Office Action", CN Application No. 201210022317.6, Mar. 4, 2014, 13 Pages.

* cited by examiner

*Primary Examiner* — Kenny Lin
*Assistant Examiner* — Joe Combs
(74) *Attorney, Agent, or Firm* — John Jardine; Andrew Sanders; Micky Minhas (57) ABSTRACT

Adaptive network communication techniques are described. In one or more implementations, a determination is made by a client device that a request, which is to be communicated to a content provider via a network, is for content that is accessible via the content provider upon authentication of credentials transmitted to the content provider from the client device. Responsive to the determination, an initial communication is formed by the client device for receipt by the content provider that includes the credentials without waiting for the content provider to request the credentials from the client device.

20 Claims, 5 Drawing Sheets

ADAPTIVE NETWORK COMMUNICATION TECHNIQUES

BACKGROUND

Use of techniques that rely on network access to data continue to increase. For example, browsers, applications, and so on may rely upon network access to retrieve, modify, and communicate data between computing devices. In this way, the data may be disseminated to connect devices and users of the devices.

However, the ever increasing reliance on these techniques may magnify inefficiencies encountered when accessing a network. For example, delays in communicating, and/or processing the data may consume a significant amount of time when multiplied by the number of times a typical user accesses a network. Thus, these delays may cause inefficiencies and lead to user frustration.

SUMMARY

Adaptive network communication techniques are described. In one or more implementations, a determination is made by a client device that a request, which is to be communicated to a content provider via a network, is for content that is accessible via the content provider upon authentication of credentials transmitted to the content provider from the client device. Responsive to the determination, an initial communication is formed by the client device for receipt by the content provider that includes the credentials.

In one or more implementations, a determination is made by a client device using data local to the client device that a request, which is to be communicated to a content provider via a network, is for content that involves a plurality of different network addresses. Responsive to the determination, a communication is formed by the client device for communication to at least one of the network addresses to retrieve a portion of the content from the network address.

In one or more implementations, execution of a browser using hardware of a client device causes data to be stored at the client device that describes interaction of the client device with content provider to obtain a webpage. Responsive to receipt of an input to make a subsequent request for the webpage, a host name in the input is automatically resolved to an IP address using the data and a determination is made as to a number of connections to open to retrieve the webpage based on the data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

The prevalence of network access techniques is ever increasing. Consequently, optimizations in these techniques may be particularly beneficial, especially when multiplied by the number of times a typical user accesses a network, e.g., to browse the Internet, access an intranet, and so on.

Adaptive network communication techniques are described. In one or more implementations, network access behavior may be adapted based on data that describes previous interaction with particular network sites. For example, the data may describe characteristics encountered during previous interaction of a client device with a content provider to obtain a webpage. For example, the data may describe whether credentials were involved to login to the content provider, host names used to provide the webpage (e.g., advertisements and other portions that may be retrieved "outside" of the content provider), a number of connections that would be optimal to communicate with the content provider or related providers, an IP address that was resolved for a host name of the content provider or related providers, and so on.

This data may then be leveraged by the client device for subsequent access attempts to the content provider. For example, the client device may automatically provide login credentials without waiting for the content provider to ask for them, thereby reducing an amount of "back and forth" between the devices over the network. Additionally, the client device may open a number of connections that are deemed optimal for the content provider, which may improve an effective connection speed. Further, the client device may further leverage a list of "where" (e.g., the URLs) the content of the webpage was obtained and may begin retrieval of the content from one or more of these locations without waiting for the content provider to indicate the locations. In this way, the client device may adapt techniques used to communicate with a content provider over a network, further discussion of which may be found in relation to the following figures.

In the following discussion, an example environment is first described that may employ the adaptive network communication techniques described herein. Example procedures are then described which may be employed in the example environment as well as other environments. Consequently, performance of the example procedures is not limited to the example environment and the example environment is not limited to performance of the example procedures.

Example Environment

Figure 1:
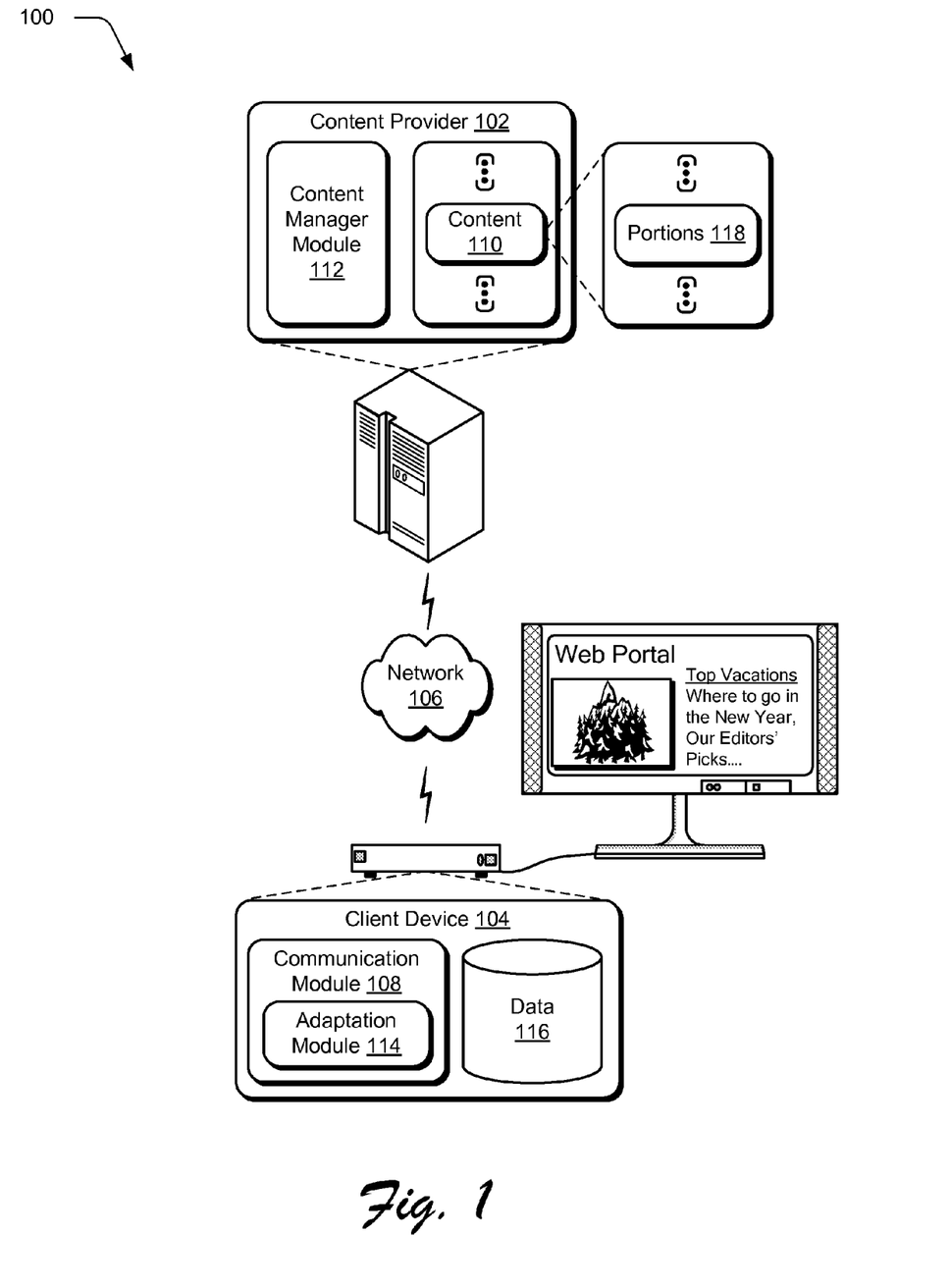
FIG. 1 is an illustration of an environment in an example implementation that is operable to employ adaptive network communication techniques.

FIG. 1 is an illustration of an environment 100 in an example implementation that is operable to employ adaptive network communication techniques described herein. The illustrated environment 100 includes a content provider 102 and a client device 104 that are communicatively coupled, one to another, via a network 106. The content provider 102 is representative of one or more network locations in this example and thus may take a variety of forms, such as a website, network address on an intranet, and so on. The content provider 102 and the client device 104 may each be implemented using a variety of different computing devices.

For example, the content provider and/or the client device 104 may be configured as a computer that is capable of communicating over a network 106, such as a desktop computer, a mobile station, an entertainment appliance, a set-top box communicatively coupled to a display device, a wireless phone, a game console, and so forth. Thus, the content provider 102 and/or the client device 104 may range from full resource devices with substantial memory and processor resources (e.g., personal computers, game consoles) to a low-resource device with limited memory and/or processing resources (e.g., traditional set-top boxes, hand-held game consoles). Additionally, although a single computing device is shown for the content provider 102 and the client device 104, the computing device may be representative of a plurality of different devices, such as multiple servers utilized by a business to perform operations of the content provider 102 (e.g., servers in one or more server farms which may be associated with the same or related network addresses), a remote control and set-top box combination, an image capture device and a game console configured to capture gestures, and so on.

The content provider 102 and the client device 104 may also include an entity (e.g., software) that causes hardware of the content provider 102 and/or the client device 104 to perform operations, e.g., processors, functional blocks, and so on. For example, the content provider 102 and/or the client device 104 may include a computer-readable medium that may be configured to maintain instructions that cause the computing device, and more particularly hardware of the computing device to perform operations. Thus, the instructions function to configure the hardware to perform the operations and in this way result in transformation of the hardware to perform functions. The instructions may be provided by the computer-readable medium to the computing device through a variety of different configurations.

One such configuration of a computer-readable medium is signal bearing medium and thus is configured to transmit the instructions (e.g., as a carrier wave) to the hardware of the computing device, such as via the network 106. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Although the network 106 is illustrated as the Internet, the network may assume a wide variety of configurations. For example, the network 106 may include a wide area network (WAN), a local area network (LAN), a wireless network, a public telephone network, an intranet, and so on. Further, although a single network 106 is shown, the network 106 may be configured to include multiple networks.

The client device 104 is illustrated as including a communication module 108. The communication module 108 is representative of functionality of the client device 104 to communicate via the network 106, such as with the content provider 102 in compliance with a hypertext transfer protocol (HTTP). The communication module 108, for instance, may include browser functionality to navigate the network 106 to obtain content 110 managed by the content manager module 112 of the content provider 102. The content 110 may be configured in a variety of different ways. For example, the content 110 may include a webpage, document for download, executable module, media (e.g., music file, video file), and so on. Further, the content 110 may be communicated via the network 106 in a variety of ways, such as for download, streaming, and so forth.

The communication module 108 is also illustrated as including an adaptation module 114. The adaptation module 114 is representative of functionality of the client device 104 to adapt network communication. For example, the adaptation module 114 may be configured to cache data 116 in storage on the client device 104 that describes network interaction, such as interaction with the content provider 102. The data 116 may be obtained in a variety of different ways, such as generated by the adaptation module 114 based on previous interaction between the client device 104 and the content provider 102, based on interaction of another device with the content provider 102, may be preconfigured by a third-party, and so on. Thus, the data 116 may describe characteristics that are specific to a particular IP address (e.g., website) to aide subsequent navigation.

In this way, the data 116 may be used to improve the user experience on visits to network sites (e.g., websites) through network usage improvements. Examples of such adaptations include pre-resolving hostnames that are typically resolved in each or most instances when visiting a website to retrieve a webpage.

In another example, a number of connections may be pre-opened to minimize user perceivable delays when visiting complex sites. This may be particular useful in certain situations as an optimal number of connections may fluctuate from website to website. In a further example, if access to a website involves authentication, a "pre-authentication" technique may be employed to provide credentials in an expedited manner.

In yet another example, the adaptation module 114 may track different network addresses (e.g., URLs) that are used to provide portions 118 of the content 110. The content 110, for instance, may be configured as a webpage an include advertisements and other information that is typically fetched from another network address, such as from an advertiser, a different server of the content provider 102, and so on. By tracking this, the adaptation module 114 may "pre-fetch" the portions 118 from these different locations without waiting for a response from the content provider 102 that specifies these addresses. In this way, the portions of the 118 of the content 110 may be obtained in an efficient manner, further discussion of which may be found in relation to FIG. 2.

Generally, any of the functions described herein can be implemented using software, firmware, hardware (e.g., fixed logic circuitry), manual processing, or a combination of these implementations. The terms "module" and "functionality" as used herein generally represent hardware, software, firmware, or a combination thereof. In the case of a software implementation, the module, functionality, or logic represents instructions and hardware that performs operations specified by the hardware, e.g., one or more processors and/or functional blocks.

Figure 2:
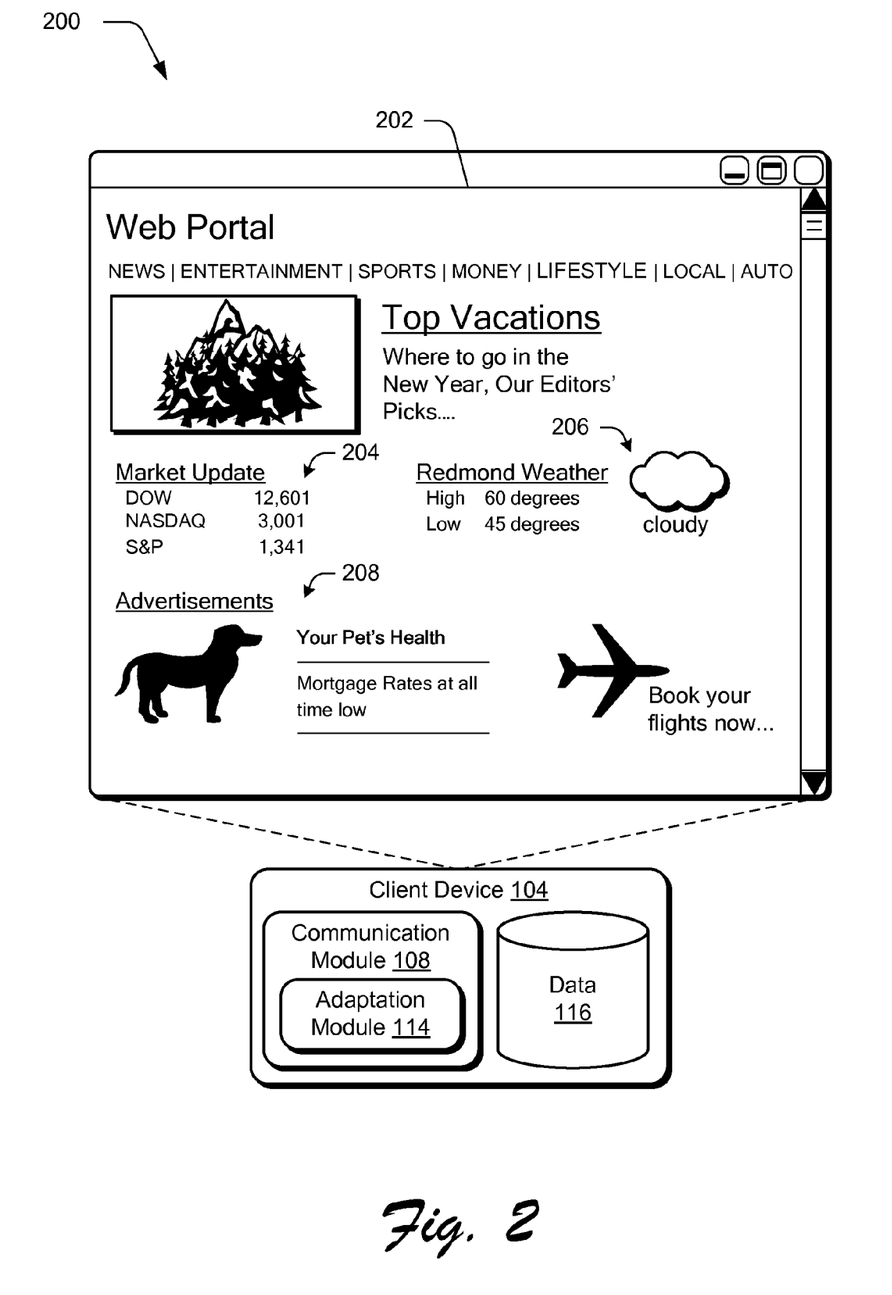
FIG. 2 depicts an example of content of FIG. 1 configured as a webpage that may be retrieved from the content provider and others as prompted by the content provider.

FIG. 2 depicts an example implementation 200 of content 110 of FIG. 1 configured as a webpage 202 that may be retrieved from the content provider 102 and others as prompted by the content provider 102. The webpage 202 as illustrated may include a variety of portions. In the illustrated example the webpage 202 is provided by a web portal and includes a header and an article that are provided by the content provider 102.

The webpage 202 also includes portions that may be obtained via other network addresses, different servers of the content provider 102, and so on. For example, a market update 204 portion may obtain values for the stock market from a third-party service. Likewise, a weather 206 portion may obtain temperatures and a weather forecast from a weather forecasting website and advertisements 208 may be obtained from websites of respective advertisers.

Accordingly, the adaptation module 114 may track which network addresses are used to provide the portions such that these portions may be pre-fetched. In a traditional implementation the communication module 108 may receive a host name, resolve the host name to an IP address using a DNS, and then request the webpage from the content provider 102. In response, the content provider 102 may provide a series of host names (e.g., URLs) that provide a source of content for each of the portions.

In the present example, however, the adaption module 114 may pre-fetch portions for other websites that are common to the webpage, such as the market update 204, the weather 206 portion, and even one or more of the advertisements 208 without waiting for the content provider 102 to specify that these portions are to be fetched. In other words, the client device 104 may begin fetching those portions without being "told to do so" by the content provider 102, thereby saving time and enabling efficient loading of the webpage 202. If it is determined that the fetched portions are not to be used to form the content (e.g., a webpage) based on subsequent communication with the content provider 102, those portions may be discarded. The adaptation module 114 may also leverage the data 116 to provide a variety of other functionality, such as to automatically resolve host names, initiate a number of connections that are optimal for a network address, and so on, further discussion of which may be found in relation to the following procedures.

Example Procedures

The following discussion describes adaptive network communication techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the example implementation 200 of FIG. 2.

Figure 3:
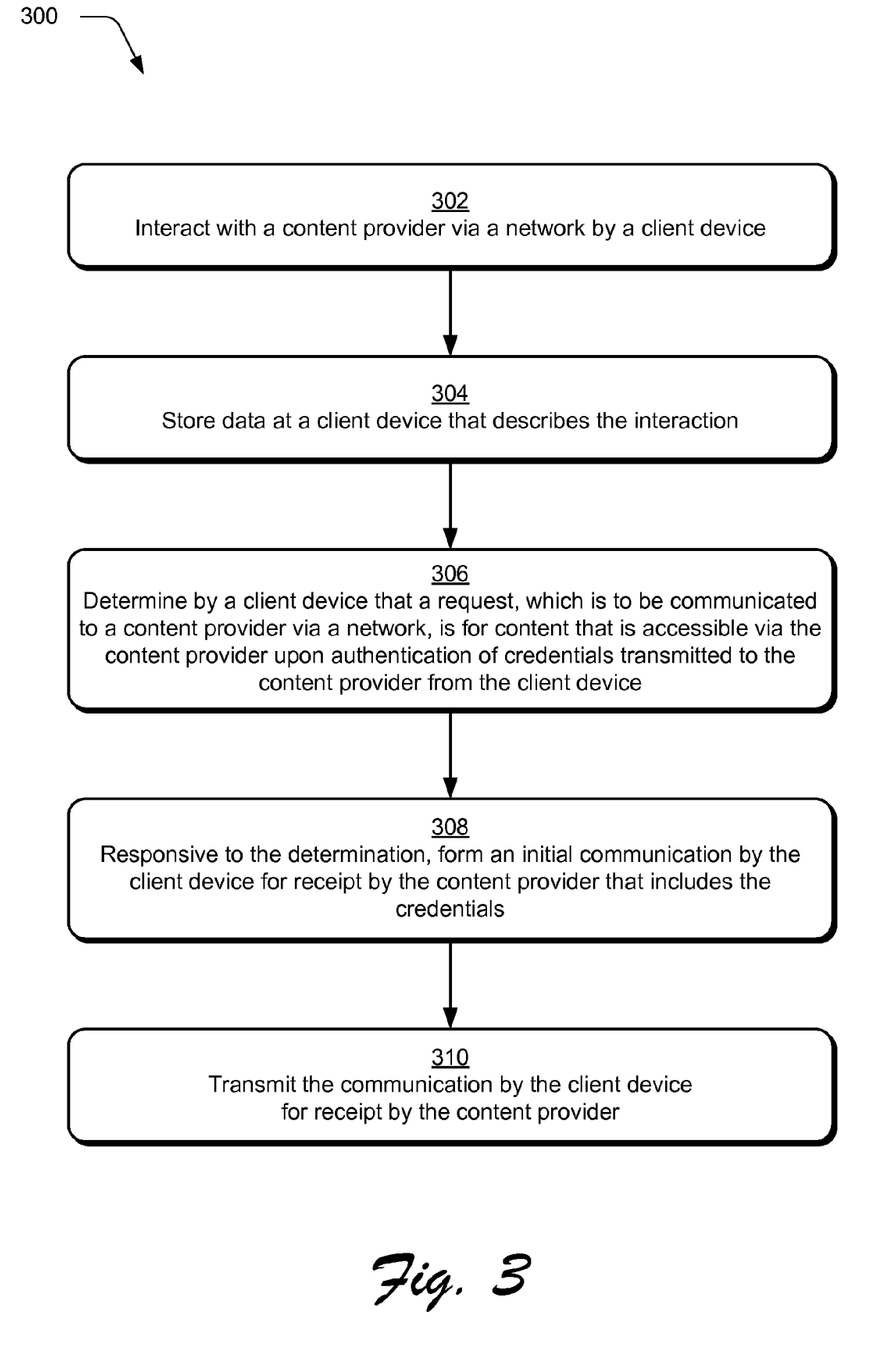
FIG. 3 is a flow diagram depicting a procedure in an example implementation in which login credentials are provided automatically to a content provider based on a determination at the client device that the content provider will request the credentials.

FIG. 3 depicts a procedure 300 in an example implementation in which login credentials are provided automatically to a content provider based on a determination at the client device that the content provider will request the credentials. A client device interacts with a content provider via a network (block 302). For example, the communication module 108 may employ browser functionality to communicate with the content provider 102 via the network 106. This communication may include resolving a host name to an IP address, forming an HTTP request to request content 110 from the content provider 102, obtaining content from the content provider 102 and other network sites, providing credentials to login to the content provider 102 (e.g., user name and password), opening a number of connections to obtain the content 110, and so on.

Data is stored at the client device that describes the interaction (block 304). A cache entry schema, for instance, may be used to store data 116 that describes a URL, response headers, an expire time, cache groups, request headers, filename, type of entry, last modified, last accessed, and last synced. The schema may also be used to store additional metadata that describes the characteristics previously described, such as whether login credentials were utilized (and if so, what they are), number of connections (e.g., simultaneous connections) that are optimal to obtain the content 110, IP addresses, and so on. This data may then be leveraged to provide a variety of functionality.

A determination is made by the client device that a request, which is to be communicated to the content provider via a network, is for content that is accessible via the content provider upon authentication of credentials transmitted to the content provider from the client device (block 306). The adaptation module 114, for instance, may detect an HTTP request for content from a particular network site. The adaptation module 114 may use a host name in the HTTP request, IP address, and so on to locate data 116 that describes interaction with the network site, which in this instance indicates that the content provider 102 permits access to content 110 after authentication of credentials.

Responsive to the determination, an initial communication is formed by the client device for receipt by the content provider that includes the credentials (block 308). The communication is then transmitted by the client device for receipt by the content provider (block 310). Continuing with the previous example, the adaptation module 114 may locate credentials that correspond to the content provider 102. These credentials may then be provided to the content provider 102 as the first communication sent from the client device 104 to the content provider 102 for the content. In this way, the adaptation module 114 may speed the process of obtaining content 110 from the content provider 102. Other techniques may also be utilized to improve efficiency of obtaining content, an example of which may be found in relation to the following figure.

Figure 4:
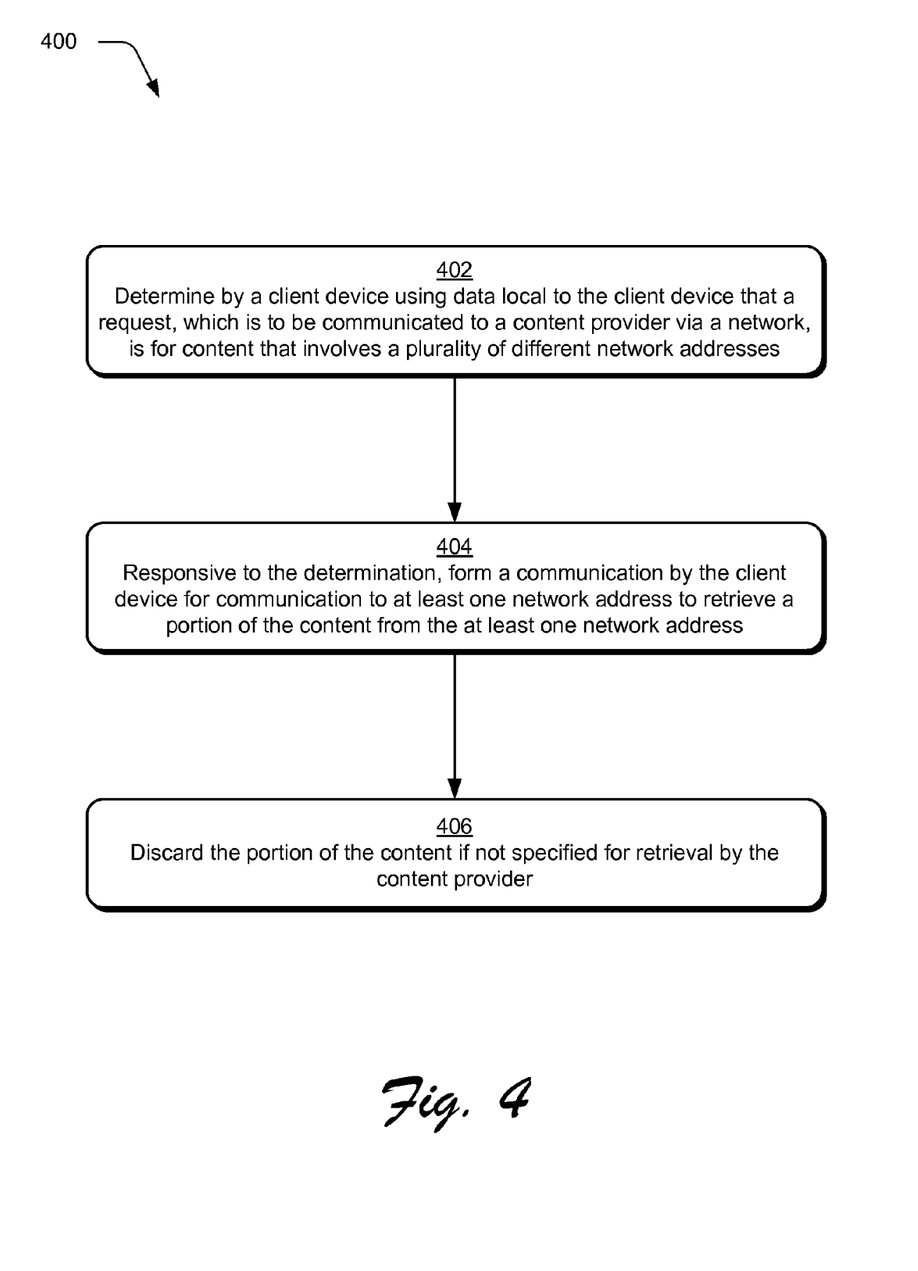
FIG. 4 is a flow diagram depicting a procedure in an example implementation in which portions of content from a plurality of websites is pre-fetched by a client device.

FIG. 4 depicts a procedure 400 in an example implementation in which portions of content from a plurality of websites is pre-fetched by a client device. A determination is made by a client device using data local to the client device that a request, which is to be communicated to a content provider via a network, is for content that involves a plurality of different network addresses (block 402). The data 116, for instance, may be collected by the adaptation module 114 over time for a plurality of different interactions between the client device 104 and the content provider 102 via the network 106, e.g., to retrieve webpages. Part of this data may describe network addresses (e.g., IP addresses, host names, and so on) utilized to provide portions 118 of the content 110 along with a corresponding counter indicating a number of times that network address was used.

Responsive to the determination, a communication is formed by the client device for communication at least one of the network addresses to retrieve a portion of the content from the at least one network address (block 404). Continuing with the previous example, the adaptation module 114 may then pre-fetch portions 118 of the content 110 that have a likelihood of being employed by the content. The portions 118, for instance, may include data obtained from third-party sources (e.g., a weather service or financial service), advertisements obtained from advertisers, and so on. Thus, this may help reduce the "back and forth" communication between the content provider 102 and the client device 104 to complete the webpage as shown in FIG. 2, thereby increasing the speed at which the webpage may be displayed at the client device 104. This may be particularly beneficial in instances in which a large amount of "outside" portions are incorporated to form the content, such as webpages from a web portal, news service, and so forth that may involve as many as fifty or more different network addresses to form a webpage.

In one or more implementations, the portion of the content is discarded if not specified for retrieval by the content provider (block 406). In this example, portions 118 may be obtained that are not specified for use in a particular version of a webpage. For instance, a prolific advertiser might not provide an advertisement in a particular version. Accordingly, if the response from the content provider 102 does not specify a pre-fetched portion 118 of the content 110, that portion may be discarded. Thus, the adaptation module 114 in this instance may be relatively aggressive in pre-fetching portions 118 based on a likelihood that the portion 118 will be used as part of the content.

Figure 5:
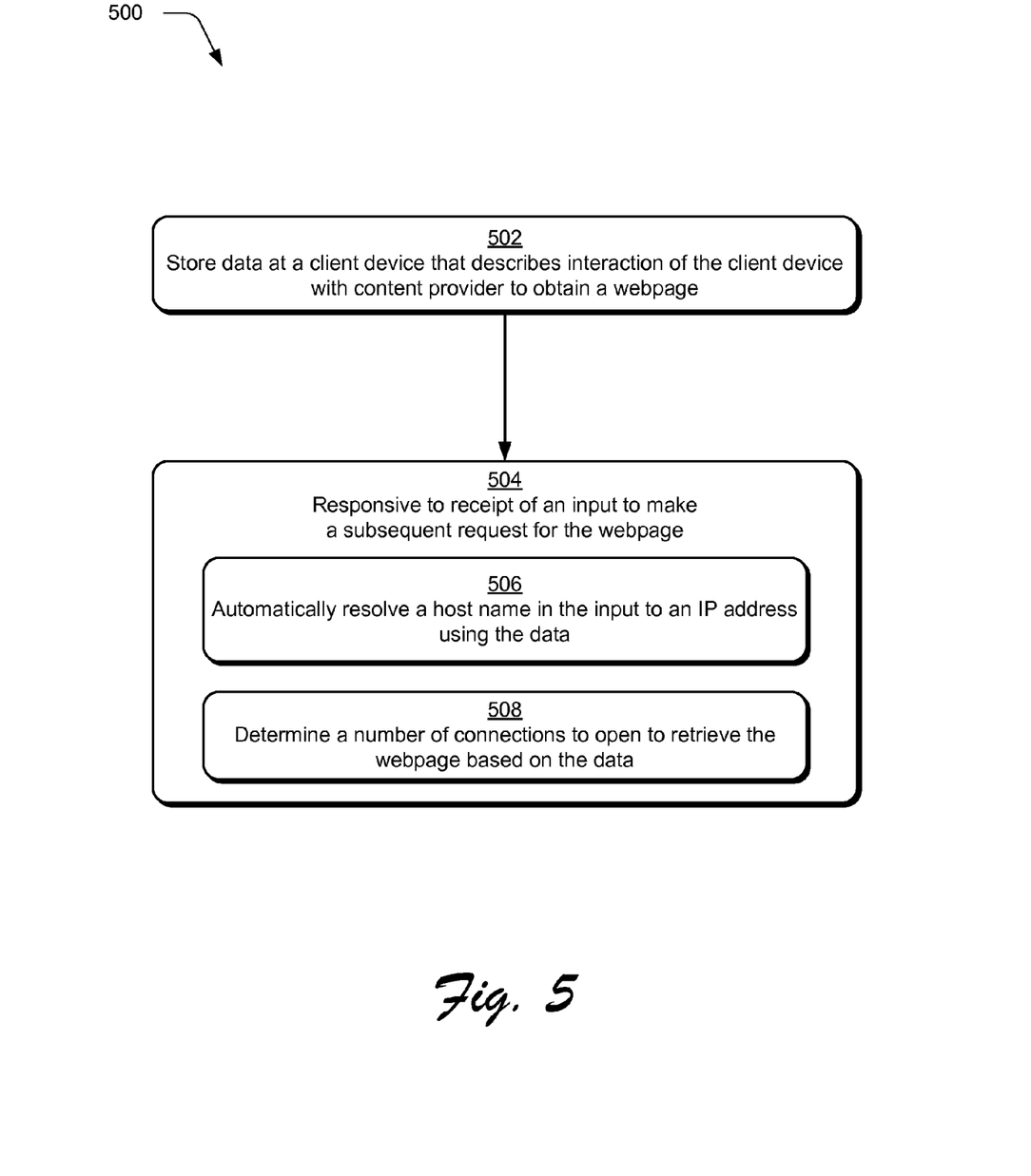
FIG. 5 is a flow diagram depicting a procedure in an example implementation in which a host name is automatically resolved to an IP address and a determination is made as to a number of connects to open to retrieve a webpage.

FIG. 5 depicts a procedure 500 in an example implementation in which a host name is automatically resolved to an IP address and a determination is made as to a number of connects to open to retrieve a webpage. Data is stored at a client device that describes interaction of the client device with a content provider to obtain a webpage (block 502). As previously described, this data may describe a wide variety of characteristics of the interaction.

Responsive to receipt of an input to make a subsequent request for the webpage (block 504), a host name in the input is automatically resolved to an IP address using the data (block 506). The data 116, for instance, may store the IP address for a host name that was obtained from a DNS such that the communication module 108 does not request the translation again. Additionally, a determination is made as to a number of connections to open to retrieve the webpage based on the data (block 508).

For example, the communication module 108 may be configured as a browser as previously described and open a number of connections to obtain content 110 from the content provider 102. Based on the characteristics of the content 110, there may be a number of connections that is considered optimal to retrieve the content 110, which may relate to a number of network addresses that are used to supply portions 118 of the content 110. Thus, in this example the adaption module 114 may preemptively open the number of connections to retrieve the content 110. As before, the data 116 may be based on interaction of the client device 104 itself with the content provider 102, preconfigured from another source, and so on.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   determining by a client device whether a request, which is to be communicated to a content provider via a network, is for content that is accessible via the content provider upon authentication of credentials transmitted to the content provider from the client device, the content including a variety of portions;
   responsive to the determining that the request involves the credentials and without waiting for the content provider to ask for the credentials, forming an initial communication by the client device for receipt by the content provider that includes the credentials;
   determining by the client device that the request is for portions of the content that involves a plurality of different network addresses;
   prefetching the portions of the content from the plurality of different network addresses;
   determining by the client device that at least one of the prefetched portions of the content is not to be used; and
   discarding that at least one of the prefetched portions of the content.

2. A method as described in claim 1, wherein the request is a hypertext transfer protocol (HTTP) request or a hypertext transfer protocol secure (HTTPS) request.

3. A method as described in claim 1, wherein the formed initial communication includes the request and the credentials.

4. A method as described in claim 1, wherein the determining utilizes data stored at the client device that is based on a previous interaction with the content provider.

5. A method as described in claim 1, wherein the determining is performed before communication of the request to the content provider without waiting for the content provider to request the credentials from the client device, the determining based on data describing previous interactions with the content provider indicating that the content provider has a likelihood of requesting the credentials.

6. A method as described in claim 1, further comprising:
   determining by the client device that the request is for content that involves a plurality of different network addresses, the determining performed before communicating the request to the content provider; and
   responsive to the determining, forming a communication by the client device for communication to at least one said network address to retrieve a portion of the content from the at least one said IP address.

7. A method as described in claim 6, wherein the forming is performed for a plurality of said network addresses using a plurality of connections in which a number of the plurality of connections that are opened by the client device is based at least in part on data stored at the client device.

8. A method as described in claim 1, further comprising translating a host name in the request to an IP address using data stored locally at the client device, the translating performed automatically and without user intervention and without accessing a network.

9. A system comprising one or more modules implemented at least partially in hardware, the one or more modules configured to perform operations comprising:
   determine by a client device whether a request, which is to be communicated to a content provider via a network, is for content that is accessible via the content provider upon authentication of credentials transmitted to the content provider from the client device, the content including a variety of portions;
   responsive to the determination that the request involves the credentials and without waiting for the content provider to ask for the credentials, form an initial communication by the client device for receipt by the content provider that includes the credentials;
   determine by the client device that the request is for portions of the content that involves a plurality of different network addresses;
   prefetch the portions of the content from the plurality of different network addresses;
   determine by the client device that at least one of the prefetched portions of the content is not to be used; and
   discard the at least one of the prefetched portions of the content.

10. A system as described in claim 9, wherein the request is a hypertext transfer protocol (HTTP) request or a hypertext transfer protocol secure (HTTPS) request.

11. A system as described in claim 9, wherein the formed initial communication includes the request and the credentials.

12. A system as described in claim 9, wherein the determining utilizes data stored at the client device that is based on a previous interaction with the content provider.

13. A system as described in claim 9, wherein the determining is performed before communication of the request to the content provider without waiting for the content provider to request the credentials from the client device, the determining based on data describing previous interactions with the content provider indicating that the content provider has a likelihood of requesting the credentials.

14. A system as described in claim 9, further comprising:
   determine by the client device that the request is for content that involves a plurality of different network addresses, the determining performed before communicating the request to the content provider; and
   responsive to the determining, form a communication by the client device for communication to at least one said network address to retrieve a portion of the content from the at least one said IP address, wherein the forming is performed for a plurality of said network addresses using a plurality of connections in which a number of the plurality of connections that are opened by the client device is based at least in part on data stored at the client device.

15. A system as described in claim 9, further comprising: translate a host name in the request to an IP address using data stored locally at the client device, the translating performed automatically and without user intervention and without accessing a network.

16. A client device comprising one or more modules implemented at least partially in hardware and configured to perform operations comprising:
   determining whether a request, which is to be communicated to a content provider via a network, is for content that is accessible via the content provider upon authentication of credentials transmitted to the content provider, the content including a variety of portions;
   responsive to the determining that the request involves the credentials and without waiting for the content provider to ask for the credentials, forming an initial communication for receipt by the content provider that includes the credentials;
   determining that the request is for portions of the content that involves a plurality of different network addresses;
   prefetching the portions of the content from the plurality of different network addresses;
   determining that at least one of the prefetched portions of the content is not to be used; and
   discarding that at least one of the prefetched portions of the content.

17. A client device as described in claim 16, wherein the request is a hypertext transfer protocol (HTTP) request or a hypertext transfer protocol secure (HTTPS) request.

18. A client device as described in claim 16, wherein the formed initial communication includes the request and the credentials.

19. A client device as described in claim 16, wherein the determining utilizes data stored at the client device that is based on a previous interaction with the content provider.

20. A client device as described in claim 16, wherein the determining is performed before communication of the request to the content provider without waiting for the content provider to request the credentials, the determining based on data describing previous interactions with the content provider indicating that the content provider has a likelihood of requesting the credentials.

* * * * *